INVENTORS:
N. VAN LOOKEREN CAMPAGNE
F. J. ZUIDERWEG
G. G. BAIJLE

BY:
THEIR ATTORNEY 3,230,282
PROCESS AND APPARATUS FOR SEPARATING
MATERIALS
Nicolaas Van Lookeren Campagne, Frederik J. Zuiderweg, and Gerhard G. Baijle, Amsterdam, Netherlands, assignors to Shell Oil Company, New York, N.Y., a corporation of Delaware
Filed Nov. 7, 1962, Ser. No. 236,015
Claims priority, application Netherlands, Nov. 13, 1961, 271,293
12 Claims. (Cl. 264—9)

The invention relates to a process and apparatus for the separation in the form of agglomerates of one or more at least substantially solid materials from a suspension thereof in a liquid, in particular, an aqueous liquid, the process comprising more than one stage.

According to a known process, an aqueous soot suspension, to which a water-immiscible liquid has been added, is fed through two identical propeller mixers in series, the agglomerates thus formed being thereupon separated from the remaining liquid.

It has now been found that a separation of this nature may be effected in a considerably more efficient manner when the treatment is carried out in several stages of varying nature as to the intensity of the treatment effected in that stage.

According to the invention, strong turbulence is induced in the suspension, either with or without the presence of one or more agglomeration promoting auxiliary liquids in a preliminary zone, and subsequently a less violent agitation is created or maintained in an agglomeration zone, the amount of specific actuating energy supplied to the preliminary zone being at least approximately twice and preferably at least approximately 2½–3½ times as great as the amount supplied to the agglomeration zone, specific actuating energy is taken to mean that energy which is supplied per time unit and per volume unit of the material present in the zone concerned.

At least substantially solid materials should be understood to include very tough, for example, pitchy, materials, of such a consistency that they can coalesce into agglomerates with or without the aid of an auxiliary liquid acting as a binding agent.

It appears that, by using a preliminary zone in which a relatively strong turbulence is maintained, the suspension becomes so finely divided that agglomeration nuclei can easily form therein, which nuclei can grow into agglomerates in the comparatively less agitated agglomeration zone. The agitation in the latter zone should not be too violent since that would entail the risk that the agglomerates in the process of forming would (again) be broken down. The amount of specific actuating energy supplied to the preliminary zone is preferably at least approximately 12 H.P./m³, while to the agglomeration zone it is preferably supplied at not more than approximately 10 H.P./m.³.

The said auxiliary liquid may be or contain an agglomeration promotor, for example, a binding agent, which should also be understood to include a material which, when brought into contact with the suspension, there generates such a promotor or binding agent physically or chemically. An auxiliary liquid of this type is thus generally, for the major part, recovered in the agglomerates.

The auxiliary liquid may also be or contain an agent which mainly promotes the formation of nuclei, either directly itself or by forming an agent of this type in situ, for example, a substance promoting the coagulation of the suspension, such as those known from colloid chemistry, or an agent promoting precipitation of a substantially solid substance in a physical or chemical way. When an auxiliary liquid of this type is used the suspension may even be formed only after treatment with this material. Such an auxiliary liquid therefore generally, for the major part, remains in the suspension liquid. It is, of course, also possible, if so desired, for a particular separation process, to use auxiliary liquids of both types, whether or not they are previously combined into one liquid. On the other hand, in another separation process, i.e. separating tacky particles, neither an auxiliary coagulating nor an auxiliary binding liquid may be required. If desired, other liquids, e.g. a suspension liquid, either that originally present and/or another, may also be added during the separation process.

To ensure satisfactory operation of the agglomeration process it is generally desirable for the agglomeration zone to include at least about two and preferably about 3–4 theoretical mixing stages. The average residence time of the suspension liquid in the preliminary zone is preferably not more than approximately ⅕ of the time in the agglomeration zone since this proportion between the length of the nuclei-forming stage and that of the actual agglomeration stage of the treatment appears in practice to give good results in the majority of cases. The desired residence time ratio may, for example, be obtained by choosing the size of the preliminary and agglomeration zones in this proportion. The average total residence time of the suspension liquid in the preliminary and agglomeration zones together need generally be not more than about 1–20 minutes, and even frequently not more than about 3–10 minutes. The average total residence time in both zones of the material to be agglomerated is preferably longer than that of the suspension liquid, in particular, between approximately 1.5 and approximately 350 times as long, since this appears to increase the degree of separation of the suspended material obtainable, and to ensure even greater compactness in the agglomerates formed. This distinction in residence times may, for example, be effected by impeding the discharge from the agglomeration zone of the agglomerates formed in relation to the discharge of the residual liquid.

It is generally preferable for a relatively considerable proportion of the contents of the agglomeration zone, viz. approximately 5–50% by volume and preferably approximately 15–35% by volume, to consist of the at least substantially solid material, i.e. already formed and possibly still growing agglomerates, and also suspended material still not combined with these agglomerates. At values below the lower limit specified, the agglomerate concentration, and thus the total surface of the agglomerates present, is so small that intensive contact is not always ensured between material still in suspension and that already agglomerated; at very high values the quantity of agglomerates is so great that difficulties may arise in maintaining or inducing agitation in the contents of the agglomeration zone.

Since the values referred to may be greater than the original concentration of the practically solid material in the suspension, special measures must in that case be taken to achieve the volume ratio referred to in the agglomeration zone; this may also be suitably obtained by relatively impeding the agglomerate discharge.

Any preliminary zone and agglomeration zone is in principle suitable for applying the method according to the invention in which it can be arranged that the amount of specific actuating energy supplied to both zones satisfies the stipulation of the said limit for the ratio between the two. Each of the said zones may thus comprise either one contacting device (either both the same or different) or several contacting devices. To generate the strong turbulence in the preliminary zone ultrasonic vibrations, for instance, may suitably be used.

The present process is in particular suitable for the agglomeration of particles not larger in size than approximately 120µ.

The purpose of the separation according to the invention may vary considerably in nature. For instance, it may be desired to free the suspension liquid from the suspended material so that the remaining liquid is as pure as possible, or it may be desired to obtain the agglomerates themselves in order to put them to some profitable use. For this purpose the suspension may be especially prepared from a finely divided substance so that the agglomeration of the said substance, which may, for instance, be originally in the form of a dry powder, can then be effected by means of the process according to the invention and the substance thus converted into a granulated form. As already indicated above, the material to be removed may originally be supplied in a non-suspended form and immediately thereafter participate in the agglomeration process. Agglomerates obtained by the present method are, in general, extremely compact and firmly cohesive, thus being easily separable from the liquid or suspension which contains them and also readily transportable.

Another use of the process according to the invention occurs in the separation of liquid, liquid dispersions; if to a dispersion of this type a finely divided at least substantially solid material is added which is capable of agglomeration with the dispersed liquid, or possibly with not all but only one or more of the dispersed liquids, the separation of the original dispersion may be effected by applying the present process to the suspension of the said substance. The addition of finely divided material to the dispersion may take place wholly or partly before it passes into the preliminary zone, or else the material and the dispersion may be supplied to this zone separately. Dispersions containing one or more hydrocarbons and water, such as oil-in-water or water-in-oil dispersion, occurring, for example, as waster water, may very suitably be separated according to this process, the former in particular with the addition of hydrophobic particles, preferably containing carbon, such as soot, slack, carbon-bearing spent cracking catalyst, or else of fly ash, the latter dispersions especially with the addition of hydrophilic, preferably calcareous, particles such as calcium oxide, calcium carbonate or other minerals and/or drying agents.

The present process may, for instance, be used for the granulation of catalysts; this may suitably be effected by treatment, according to the said process, of an aqueous suspension of one or more elements and/or compounds with catalytic properties promoting one or more chemical reactions.

The process may also be suitably used for the separation of adducts of urea and paraffin wax from an oil phase, such as those occurring in dewaxing process, based on extractive crystallization. If desired, water may then be added as auxiliary liquid. The process is also very suitable for the recovery of magnetite from drilling mud, components already present in the drilling mud apparently acting as auxiliary liquid, so that it is not necessary to add special auxiliary liquid.

The present process is also suitable for recrystallizing dissolved materials from their solution. The preferably saturated solution is supplied to the preliminary zone, in which, e.g. through cooling by means of a cooling jacket or the like, a temperature below crystallization point is obtained; a suspension of crystal nuclei is then formed in this zone. The temperature in the agglomeration zone is also below crystallization point; the nuclei formed in the preliminary zone are then in general sufficiently tacky to coalesce into solid crystal masses without the use of an auxiliary liquid.

Another preferred application of the process according to the invention, is the separation of soot from aqueous suspensions, in particular those obtained in the scrubbing of gases produced in the incomplete combustion of hydrocarbon materials with an underdose of oxygen, the auxiliary liquid used being a hydrocarbon oil, preferably a residual fuel oil or a crude oil, in particular in a proportion by weight of approximately 1–7 parts, more particularly approximately 3–5 parts, based on the soot.

Another suspension suitable for separation by means of the process, according to the invention, is an aqueous polymer suspension, for instance, such as may be obtained in a polymerization process possibly but not necessarily as waste water. In particular by the present method elastomers, such as styrene-butadiene rubber or some other natural or synthetic rubber, may suitably be obtained from their aqueous lattices by means of an aqueous electrolyte solution acting as a coagulating auxiliary liquid; an agglomerating auxiliary liquid is generally superfluous in this case, since the suspension consists of somewhat tacky, quite easily coagulating particles. An aqueous polypropylene suspension may also be very suitably treated by means of the present process; in this case a coagulating agent is not required but an agglomerating agent generally is, and for this a hydrocarbon oil, in particular a heavy oil, such as a residual fuel oil or a heavy gas oil, may also be suitably employed, preferably in a proportion by weight smaller than approximately 1 based on polypropylene.

Besides being appropriate for the recovery of agglomerates which are of value in themselves, the removal of suspended material from the suspension liquid and the separation of liquid-liquid dispersions, as is described above, the present process is also extremely suitable for the separation of finely divided, at least practically solid materials from each other. In fact when a suspension of such materials is available, which may, if desired, have been specially prepared from materials present in a dry form, it is frequently possible to choose operational conditions in the process according to the invention of such a type that some of these materials agglomerate and some others do not agglomerate at all or only do so to a much smaller extent. This may be effected, for example, by a suitable choice of auxiliary liquid. Agglomerates are thus obtained from one or more of the materials in a suspension of the other practically non-agglomerating materials and the two may be separated in a simple manner, e.g. by filtration, decanting or the like. It is also possible to induce agglomeration in the material or materials which did not agglomerate in the first place by a further treatment of the residual suspension under different conditions, which treatment may if necessary be repeated once or more than once. In this way a separation of the original mixture of solid materials into two or more types of agglomerates is finally achieved.

This embodiment of the process according to the invention may be very profitably used for the separation of coal and gangue obtained together in aqueous suspension in the process of coal washing. The auxiliary liquid used may suitably by a hydrocarbon oil, preferably a residual fuel oil, in particular in a proportion by weight less than approximately 1 based on the coal.

A suitable apparatus for carrying out the process according to the invention comprises two surfaces lying one inside the other but not in contact with the other, preferably surfaces of revolution, having at least substantially parallel axes, and in particular being coaxial, with at least one surface being rotatable in relation to the other and in particular at least one being cylindrical, the outer surface extending further in an axial direction than the inner surface at least at one end; means for inducing strong turbulence in the contents of the end section or one of the end sections of the space enclosed by the outer surface in which the inner surface is not present; one or more inlets issuing in the said end section and one or more outlets isuing in that section of the space enclosed by the outer surface which is furthest away from the said end section, preferably in the annular space defined by the outer and inner surfaces. To this end the inner surface may be formed by a screw preferably of constant pitch and/or span, the outer surface and/or the screw being rotatable in relation to each other in such a direction that when there is rotation the resultant direction of rotation which develops is the opposite of the direction of the screw windings. For this purpose the screw may be designed in the way conventionally used for screw pumps; though different in that the screw does not in this case engage the outer surface so as to avoid obstruction of the transport of agglomerates to the outlet or outlets. The screw may also be a helical vane, strip or thread, possibly wound round a shaft of greater or lesser thickness. When rotation in the prescribed direction takes place, a flow is set up between the screw and the outer surface with an axial component directed towards the outlet or outlets so that the agglomerates are easily swept to the outlet or outlets by the suspension liquid.

The inner surface may also suitably consist of a preferably circular cylindrical shaft, possibly provided with annular thickenings such as discs and/or one or more radial longitudinal strips. When the shaft is comparatively thick such a thickening may, for instance, consist of a piece of wire wound round the shaft; on the other hand, discs are generally fitted on a comparatively thin shaft. The longitudinal strips referred to may be fitted all along the shaft, or alternatively along one or more sections thereof, e.g. at intervals or staggered.

As indicated above, the inner surface does not extend to the end of the apparatus at the inlet end; this may also be the case at the discharge end, the outlet or outlets thus being able to issue in a discharge compartment into which the inner surface does not extend; the presence of such a compartment, however, makes the apparatus unnecessarily long and it is therefore preferable for the outlets to issue in the annular space itself.

In these apparatuses the said end section serves as preliminary zone, while the said anular space, and if desired a compartment of the type indicated, form the agglomeration zone. The suspension, and if desired one or more auxiliary liquids, may be supplied either wholly or partly together or separately. The surfaces are preferably vertical and the said end section consists of the lower part of the space enclosed by the outer surface.

The above-mentioned means for generating the desired strong turbulence in the said end section may, for example, be such that rapid, preferably axial, vibrations are induced in the contents of this section, possibly even so rapid that the said vibrations are in the ultrasonic range. They may also very suitably consist of one or more, in particular coaxially arranged, agitators while preferably at least one of the said agitators is designed as a scraper; these agitators may, of course, be supplemented by other means if desired. The agitators may be embodied in any suitable manner, e.g. provided with agitating arms, propellers, blades, turbines or the like. It is also possible to have a plurality of agitators of different types. The use of a scraper or scrapers prevents solid material from settling in the lower section of the apparatus and so failing to contribute to the nuclei-forming process and thus subsequently to the agglomeration process, or doing so only with difficulty. In operation such a scraper may, for instance, skim closely over the bottom and/or along the wall of the apparatus.

The diameter, or the average diameter when it is not constant, of the outer surface where an agitator is provided is preferably at most approximately twice as large as the total span of the agitator in question.

In addition, the outer surface is preferably stationary and the inner surface rotatable, while the one or more agitators are connected to the latter surface in such a way that they rotate together with the said surface when it rotates. From the point of view of construction this is a very simple solution, eliminating the need for separate driving mechanisms to operate the agitators and the inner surface.

To increasé the turbulence in the end section which serves as the preliminary zone one or more, in particular radial, baffles are preferably fitted to the outer surface in this end section; the same effect may be produced or obtained in greater degree when one or more inlets extend into the said end section, i.e. when they pass through the outer surface to the inside. At the same time this reduces the possibility of sedimentation on the inner wall of the apparatus.

The one or more outlets leading from the apparatus suitably communicate with one or more apparatus for agglomerate separation, which are preferably embodied as a line, in particular as a channel either open or closed at the top, and more especially a sloping channel, with a wall or a section of a wall permeable to liquid and to any finely divided material which may still be present, but impermeable or substantially impermeable to agglomerates, being in particular the bottom of the line or channel or a section thereof; the wall or bottom may, for instance, consist entirely or partly of a perforated plate, plaited material or the like; the open space thereof is suitably about 50%.

In order to effect a difference in the residence time for agglomerates and suspension liquid, the apparatus is preferably provided with a member permeable to liquid and to any finely divided material present, but impermeable or substantially impermeable to agglomerates, by means of which at least one of the said outlets may be at least partially, and preferably adjustably, blocked. Such a member may, for instance, be a screening plate, plaited material or the like, preferably arranged slidably or rotatably in the outlet.

In order to ensure that the nuclei-forming and agglomeration processes in the apparatuses in question proceed as desired, it is advisable that the dimensions thereof should fulfill certain conditions; thus the average diameter of the outer surface is preferably at most approximately three times and preferably at most twice the average diameter of the inner surface, both measured at least substantially at the same place; the length of the said end section of the space enclosed by the outer surface, measured in an axial direction, is at least substantially equal to the average diameter of the said surface; and/or the length of that section of the outer surface which encloses the inner surface, measured in an axial direction, is at least approximately three times and preferably not more than approximately ten times the average diameter of that section. The first and the last conditions affect the agglomeration process, since they determine the design of the agglomeration zone; the second condition affects the nuclei-forming process because it determines the design of the preliminary zone.

The invention will now be further explained with reference to the drawing which shows some embodiments of the apparatus referred to.

Figures 1, 2:
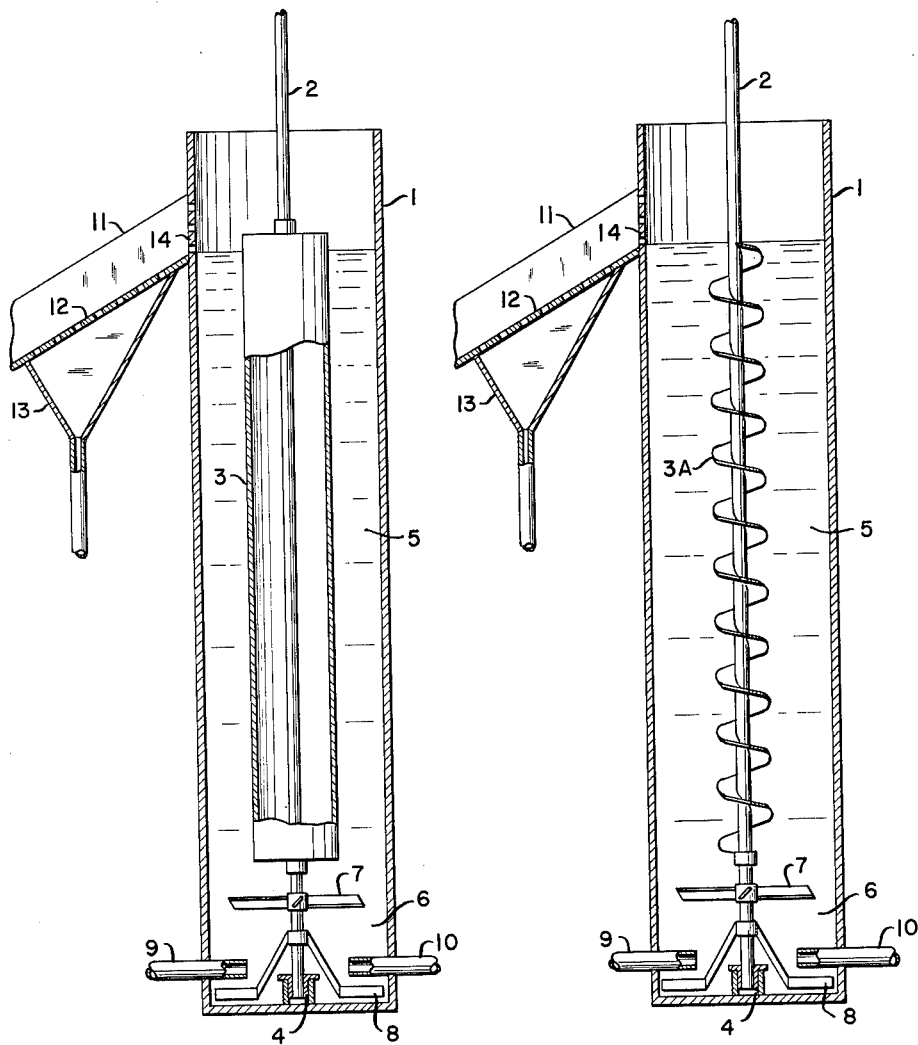
FIG. 1 is an elevation partially in section of one form of the apparatus.
FIG. 2 is an elevation partially in section of another form of the apparatus.

Referring to FIG. 1 of the drawing, an apparatus is shown comprising a vertical and stationary casing or stator 1, which in this case is open at the top, and has a circular cylindrical wall and flat bottom although another design is also possible, for example, an elliptical cylinder or the like. It also has a rotatable shaft 2 with a rotor 3, in this case circular cylindrical, but also possibly of another type, e.g. conical, and here also hollow, flat at both ends but possibly of a different design, e.g.

with a bottom of inverted, conicity or the like. The shaft 2 is provided with means of rotation such as an electric motor or the like (not shown). The shaft 2 can rotate in a bearing 4. Between the rotor 3 and the stator 1 is an annular space 5; the rotor, however, does not extend right to the bottom of the stator, thus leaving a space 6. In the embodiment shown, agitators 7 and 8, in this case two, but possibly only one or more than two agitators, are secured to the section of the shaft 2 which extends under the rotor 3. In this case the agitator 7 is designed as a propeller with three blades each at an angle of 45° to the vertical plane. The agitator 8 here consists of a scraper with two blades capable of sweeping closely over the bottom and along the wall of the stator; other embodiments, however, are also possible. Inlets 9 and 10 issue in the space 6; in the embodiment shown, two inlets are present facing each other and at about the same height, viz, in between the height of the two agitators; a different arrangement is also possible. The inlets here shown pass through the stator wall so that they can serve to increase the turbulence prevailing in this space when the apparatus is in operation. For this purpose one or more further baffles, not shown, may be fitted in this space.

In the embodiment shown, one outlet 11 issues in the top of the annular space 5; in this case it is designed as an open channel provided with a screen bottom 12 communicating with a funnel-shaped outlet 13. A screen plate 14, in this case adjustable, for example, a flap or slide, not shown, is fitted in the mouth of the outlet 11 by means of which plate the said outlet may be made entirely or partly impermeable to agglomerates.

In operation the suspension to be treated, which, if desired, may be admixed with auxiliary liquid, is introduced through the inlets 9 and 10 (the suspension and auxiliary liquid may suitably be introduced through different inlets); when more than one auxiliary liquid is used more inlets may be fitted if required, though this is not usually necessary. Strong turbulence is induced in the contents of the space 6, which serves as a preliminary zone, by the agitators 7 and 8 and agglomerate nuclei are thus formed in the suspension; the agitator 8 which is designed as a scraper prevents any originally suspended material from settling against the wall and on the bottom of the stator. The appropriate rotation speed of the shaft 2 depends inter alia on the dimensions of the apparatus, the nature of the suspension and such auxiliary liquid or liquids as may be used, and should therefore in practice be decided on the merits of the particular case. The nuclei pass into the space 5 which acts as the agglomeration zone, where, as a result of the gentle movement generated by the rotor, they grow into agglomerates; liquid and agglomerates leave the said space through the channel 11, the liquid, with any non-agglomerated material, passing through the bottom 12 and leaving the apparatus via the outlet 13. The ratio between the residence time of agglomerates and of liquid, and the volume ratio of solid material to the total contents of the agglomeration zone, are regulated by the position of the screen plate 14, i.e. by the ratio of the open part of the outlet mouth to the part blocked to agglomerates; they may therefore be adjusted and possibly altered as required.

Referring to FIG. 2 of the drawing, another embodiment is shown of the apparatus according to the invention; here like elements 1 to 14 inclusive perform the functions analogous to those already explained with reference to FIG. 1. The rotor, however, is different and now designed as a screw having, in the embodiment shown, constant pitch and span and is designated by numeral 3A. In the apparatus of FIG. 2, nuclei are also formed in the space 6 when the apparatus is in operation; the rotor is rotated in the opposite of the direction of the screw windings and the resultant agglomerates are carried, inter alia, by means of the flow thus created, to the channel 11 and there separated from the suspension liquid by means of the screen bottom 12.

The invention will be further illustrated with reference to the following examples.

*Example I*

A soot suspension was introduced into an apparatus of the type shown in FIG. 1 by the inlet 9, which suspension had been obtained in the scrubbing of gases produced in the incomplete combustion of a residual oil with an underdose of oxygen. The suspension contained approximately 1% by weight of soot with an average particle size of approximately $10\mu$. Different hydrocarbon oils were successively introduced through the inlet 10 as auxiliary liquid, viz. a gas oil, a relatively viscous, residual fuel oil and a very viscous crude oil, in a proportion of approximately 3 to 4½ parts by weight based on the soot in the suspension. In all these cases, with a liquid residence time of about 3 to 5 minutes in the apparatus and a solid material residence time of approximately four times as long, a separation was effected of about 99.9% of the soot in the form of non-tacky, compact pellets of approximately 2–6 mm.

*Example II*

An aqueous polypropylene suspension (0.5% polymer, particle size about $100\mu$) left over as waste water from a propylene polymerization process was introduced via the inlet 9 into an apparatus of the type shown in FIG. 1. The auxiliary liquid was a heavy gas oil, supplied through the inlet 10, in a proportion by weight of approximately 0.8 part based on polypropylene with a residence time of about 8 minutes, approximately 95% of the polymer was separated as agglomerates of size approximately 2 mm.

*Example III*

A slack with a particle size of approximately $120\mu$ was entrained in water (about 6% by weight of carbon) and treated in a similar way to that described in the preceding examples, by means of approximately 0.5 part by weight (based on carbon) of gas oil, or approximately 0.7 part by weight of a viscous, residual fuel oil. In both cases with a residence time of approximately 5 minutes about 98% of the carbon had agglomerated into pellets of size approximately 3–4 mm.

A coal and stone suspension which had been obtained in coal-washing (approximately 7% by weight of coal, particle size about $55\mu$) was treated in a similar way but with a slightly less viscous residual fuel oil (0.5 part by weight of coal). With a residence time of approximately 7 minutes, about 90% of the coal was separated off as firm pellets of approximately 2–5 mm. in size, while 95% of the stone originally present (approximately 3% by weight) remained in suspension.

*Example IV*

A styrene-butadiene rubber latex creamed by heating with brine (approximately 7% by weight of rubber, particle size approximately $50\mu$) was introduced through the inlet 9 into an apparatus of the type shown in FIG. 1; a coagulating medium, viz. a 2% sulfuric acid solution, was introduced as auxiliary liquid in a quantity such that the pH of the resulting mixture was approximately 5. With a residence time of approximately 10 min., about 99.9% of the rubber was separated from the suspension in the form of compact pellets of 1 to 1½ mm. For the conventional separation of rubber from a latex of this type a pH drop of up to approximately 2–3 is necessary; the present process therefore effects at the same time a considerable saving in acid.

A dilute styrene-butadiene rubber latex, which was obtained as waste water in a conventional latex separation process (approximately 1% of rubber, particle size approximately $0.5–10\mu$) was treated in a similar way; but in this case the auxiliary liquid used was a 10% sulfuric acid solution, added up to a pH of approximately 3, and the residence time was approximately 5 mins.; substantially the same process was used with waste water containing approximately 0.1% of styrene-butadiene rubber. In the latter case a separation of 85% was obtained and in the former as much as 98%, both in the form of crumbs of approximately 2–4 min.

We claim as our invention:

1. A process of separating, in the form of agglomerates, one or more substantially solid materials from a liquid suspension thereof, said process comprising:
   (a) introducing said liquid suspension into a preliminary zone;
   (b) forming agglomeration nuclei of said solid materials by producing in said preliminary zone a turbulence strong enough to finely divide said materials contained in the suspension;
   (c) subsequently passing the resulting suspension of said nuclei in the liquid into an agglomeration zone;
   (d) producing agglomerates from said nuclei which have been passed into said agglomeration zone by subjecting said nuclei to a uniform gentle agitation of substantially less magnitude than the strong turtulence produced in said preliminary zone.

2. A process as set forth in claim 1 wherein said agglomeration zone is an elongated vertically extending area positioned above said preliminary zone and wherein said agitation is substantially uniform throughout the height of said agglomeration zone; said process further comprising discharging said agglomerates from said agglomeration zone so that they may be collected.

3. A process as set forth in claim 1 wherein an amount of actuating energy is supplied to said preliminary zone which is approximately two to three times as great as the amount of actuating energy supplied to said agglomeration zone.

4. A process as claimed in claim 1, characterized in that the amount of specific actuating energy supplied to the preliminary zone is at least 12 H.P./m.$^3$, while the amount supplied to the agglomeration zone is preferably not greater than 10 H.P./m.$^3$.

5. A process as set forth in claim 1 wherein:
   (a) the average total residence time of the suspension liquid in the preliminary and agglomeration zones is one to twenty minutes;
   (b) the average residence time of the suspension liquid in the preliminary zone is not more than one-fifth the time spent in the agglomeration zone; and
   (c) the amount of substantially solid material present in the agglomeration zone is 5–50% by volume of the total content of this zone.

6. A process as set forth in claim 1, characterized in that the suspension is one of adducts of urea and paraffin wax in oil.

7. A process as set forth in claim 1, characterized in that the suspension is a styrene-butadiene rubber suspension.

8. Apparatus for separating, in the form of agglomerates, one or more substantially solid materials from a liquid suspension thereof, said apparatus comprising:
   (a) a vertical, open-topped, closed bottom, generally cylindrical casing means for containing said liquid suspension;
   (b) inlet means located near the bottom of said casing for introducing said liquid suspension thereto;
   (c) outlet means located near the top of said casing for discharging liquid and agglomerates separated from said suspension;
   (d) rotatable shaft means centrally mounted on the bottom of said casing and extending vertically throughout the length of said casing to a point above the top of said casing;
   (e) scraper means mounted on the lower end of said shaft for preventing suspended material from settling on the bottom of said casing;
   (f) agitator means mounted on the lower end of said shaft and at a location above said scraper means; said agitator means being capable, upon rotation of said shaft, of producing a first zone of strong turbulence for finely dividing the solid materials of said suspension into agglomerate nuclei; and
   (g) rotor means mounted on said shaft at a location above said agitator means for producing an elongated second zone of uniformly gentle agitation throughout the length of said second zone upon rotation of said shaft.

9. Apparatus as set forth in claim 8 wherein said rotor means comprises a generally circular cylindrical shaft whose diameter is approximately one-half the diameter of said casing.

10. Apparatus as set forth in claim 8 wherein said rotor means comprises a constant pitch screw having a constant radial span which is slightly less than one-half the diameter of said casing.

11. Apparatus as set forth in claim 8 wherein said first zone has a dimension in the axial direction which is at least as great as the diameter of said casing and wherein said second zone has a dimension in the axial direction which is from three to ten times greater than the diameter of said rotor.

12. Apparatus as set forth in claim 8 wherein said inlet means comprises a plurality of small diameter pipes which extend into the casing at a location between said scraper means and said agitator means to produce a baffle effect upon rotation of said shaft.

References Cited by the Examiner

UNITED STATES PATENTS

| | | | |
|---|---|---|---|
| 1,155,836 | 10/1915 | Owen | 209—169 |
| 1,284,945 | 11/1918 | Swann | 259—197 |
| 1,343,313 | 6/1920 | Dolbear | 209—160 |
| 2,016,647 | 10/1935 | McMartin | 259—97 |
| 2,242,139 | 3/1941 | Monroe | 210—44 |
| 2,245,588 | 6/1941 | Hughes | 210—46 |
| 2,296,437 | 9/1942 | Green | 210—44 |
| 2,361,283 | 10/1944 | Good | 210—49 |
| 2,509,695 | 5/1950 | Parker | 210—46 |
| 2,903,423 | 9/1959 | Mondria | 210—44 |
| 2,907,455 | 10/1959 | Sasaki | 209—5 |
| 2,952,358 | 9/1960 | Schoeld | 209—166 |
| 3,045,818 | 7/1962 | Muschenborn | 209—5 |
| 3,101,312 | 8/1963 | Brinkman | 209—172 |

ROBERT F. WHITE, *Primary Examiner.*

HERBERT L. MARTIN, *Examiner.*